Patented June 23, 1953

2,643,199

UNITED STATES PATENT OFFICE 2,643,199

PROCESS OF FORMING A LAYER OF METALLIC COPPER ON COPPER OXIDE

Paul Hersch, Birmingham, England

No Drawing. Application October 22, 1951, Serial No. 252,570. In Sweden December 18, 1945

10 Claims. (Cl. 117—50)

This invention relates to a new process of producing a layer of metallic copper by autoreduction of the surface portion of a layer of copper oxide (cuprous oxide or cupric oxide or both) which layer of copper oxide is supported upon or carried upon a solid base, which base may be metallic copper or it may be something entirely different and may be porous, e. g. pieces of pumice stone.

An object of the invention is the reduction of the surface of a shaped body, the surface portion of which body is composed of a copper oxide, and the depth or thickness of the metallic copper coating formed by such reduction can be extremely thin or it can be thicker if desired. It is readily possible to produce a copper coating by reduction which will be so thin as to be a substantially transparent film, when desired, or the copper coating produced, if desired, can be much thicker, so that the copper coating will resist atmospheric and moderate thermic influences. It can be so thick that it can be polished, e. g. with emery. In all cases, the coating of metallic copper formed adheres intimately to the oxide layer forming a good electrical contact therewith. This applies whether cuprous oxide only or cupric oxide only or both cupric oxide and cuprous oxide are originally present.

The process is suitable for the production of copper oxide rectifiers or photoelectric cells (the base being metallic copper) or for forming a catalyst body (the base of which can be an inert carrier, e. g. granules or plates or other shaped bodies).

The reduction of the copper oxide is effected by autoreduction by an alkaline solution of an aldehyde. The alkali can be carbonate or preferably caustic soda (or potash) being very suitable. The aldehyde can be formaldehyde, acetaldehyde, propionaldehyde, furfural or any of the common aldehydes. Formaldehyde is cheap and effective and available everywhere and is usually preferred. The solvent in such alkaline solution is preferably water, but other solvents such as alcohol or dilute alcohol, etc. are suitable.

A particularly valuable feature of the process is that it is not necessary to employ heat, electricity or other external force, and the alkaline solution of the aldehyde can be applied to the article (preferably already shaped as desired) at room temperature. But the said solution can be applied, and is effective at various temperatures between 0° C. and the normal boiling point of the solution.

While the alkaline solution of the aldehyde alone can be applied direct to the article having a relatively thick coating layer of copper oxide (cuprous or cupric), the reduction of the surface portion, though fairly rapid once started, is apt to commence only after some time lag. It is, however, possible to initiate the autoreduction by touching it off with metallic nuclei, e. g. of silver, platinum, or copper itself, for instance by providing for the presence of particles of metallic copper suspended in the solution, which particles contact the copper oxide coating and serve to form points at which the reaction starts rapidly and spreads out over the entire surface area. The said metallic particles have preferably been produced by the aldehyde itself, and preferably are in a finely divided state. But particles which form by chips or fins breaking off the edges of oxidized copper plates, are effective for the same purpose. The presence of such copper particles in the alkaline solution of aldehyde causes the reduction of the surface of the copper oxide to start (at the points of contact) almost instantly.

After the surface of the copper oxide has been reduced to a thin coating of metallic copper, leaving a substantially complete skin of metallic copper upon the surface, the autoreduction continues, thereby producing a thickening of the metallic copper coating (while the layer of copper oxide grows correspondingly thinner).

It is often advisable to add an alkaline solution of a copper compound to the alkaline solution of aldehyde. For this purpose, the well known "Fehling's solution" is suitable. The use of such an alkali soluble copper compound in the alkaline solution of the aldehyde considerably strengthens the copper coating produced. The use of the alkaline solution of copper compound, however, is optional.

Instead of using the suspension of copper particles for initiating the reduction of the copper oxide, it is also possible to achieve this initiation by treating the oxide surface (cuprous oxide in particular, and to some extent cupric oxide surface) with a dilute solution of a silver compound, e. g. silver nitrate. The article can be immersed for a short time in a dilute (e. g. 0.2%) solution of silver nitrate. This is done before the treatment with the alkaline aldehyde solution, whether or not the alkaline solution of copper salt is added to the latter.

In the preferred form of carrying out the invention, starting, say with a metallic copper blank, I first oxidize the surface of this (e. g. by heating to about 1000° C. and cooling in air) to leave a layer of cuprous oxide having its surface portion oxidized to the black cupric oxide. The original copper blank may have the size and shape of the copper oxide rectifier to be produced.

An aldehyde and water (e. g. commercial formaldehyde solution 35 to 40% is mixed with an alkali solution, say sodium hydroxide solution to form the agent for effecting autoreduction of the oxides of copper. Optionally a small amount of cupric oxide powder is first added to a small amount of the alkaline solution of aldehyde (e. g. at room temperature) and reaction starts in promptly, with liberation of hydrogen gas. After the reduction of the copper oxide powder has progressed somewhat (but without necessarily waiting for the reduction of all of the copper oxide powder) this mixture is poured into the receptacle containing the copper oxide coated bases (e. g. the blanks from which the current rectifiers are produced), immersed in a quantity of the alkaline solution of the aldehyde. The suspension so poured in now contains loose particles consisting each partly or wholly of metallic copper. These particles tend to settle upon the surface of the blanks, and within a few minutes the entire submerged surfaces of the blanks have undergone the autoreduction, with liberation of hydrogen. By continuation of the process, this coating of reduced copper becomes thicker and thicker. The blanks are withdrawn from the reducing liquid before all of the copper oxide has been reduced. The copper adheres so firmly to the underlying residual copper oxide that it cannot be rubbed off.

The autocatalytic reaction for the reduction of the copper oxide may be given as follows:

$$CuO+2H_2CO+2OH^-=Cu+2HCO^-_2+H_2+H_2O$$
$$Cu_2O+2H_2CO+2OH^-=2Cu+2HCO^-_2+H_2+H_2O$$

The relative amounts of alkali and aldehyde can be as indicated in these reactions, but an excess of either can be present in the solution.

Operating in this manner, the entire process may be complete in a few minutes if only a thin layer of copper on the copper oxide is required, but when much thickers layers of metallic copper are desired, half an hour or up to a few hours of contact of the copper oxide surface with the alkaline solution of aldehyde should be allowed. If the addition or presence of an initiator such as the fine solid particles is omitted, the process is operative and effective, but the start of the reaction (though not its progress) is somewhat erratic. A short contact of the oxide surface with dilute silver nitrate solution prior to the treatment with alkaline aldehyde solution helps to initiate the autoreduction process in the latter. When the copper blank is coated with cuprous oxide only (without cupric oxide) the process is also effective, but in the case where rectifying elements are to be made it is advisable not to continue contact of the plates with the alkaline aldehyde solution too long (e. g. preferably not over one hour), otherwise there is a slight possibility of a metallic bridge growing at one or several places between the copper blank carrying the oxide and the copper layer produced by the process out of the oxide.

The alkaline aldehyde solution should preferably be made up every day.

It often happens that during the process small chips split off the oxidized copper blanks if these have sharp edges. This does not damage the blanks themselves, and the small splinters will act to initiate the reaction in a subsequent batch.

The present application is a continuation in part of my copending application filed March 18, 1946, Serial No. 655,371 now abandoned.

Without restricting myself to details, I give, for the purpose of illustration, the following examples:

*Example 1.*—3 ml. of commercial formaldehyde solution (about 40% by weight) are added to 100 ml. of a 1.5% aqueous solution of sodium hydroxide. A copper blank, covered with cuprous oxide and carrying an outer skin of cupric oxide (e. g. as obtained by heating the metal blank at 1000° C. in air) is dipped into the solution. After a certain time lag (up to several hours) a metallic copper spot appears on the black oxide, usually at the edge of the plate, or several such spots appear at the same time. The spots grow quickly in size and within a few minutes after the appearance of the first spot the whole surface of the black oxide has turned into copper. The coppering process also spreads in depth, though more slowly, and attacks the layer of cuprous oxide. The plate may be withdrawn as soon as the whole of its surface shows metallic lustre, or it may remain in the bath say half an hour longer to allow the copper film to grow in thickness.

*Example 2.*—A few ml. of the alkaline formaldehyde solution of Example 1 are set aside and a few decigrams of fine cupric oxide powder are added. The powder particles react readily with the solution, as can be seen by an abundant evolution of hydrogen bubbles. The suspension of powder particles is now poured into the main portion of the alkaline formaldehyde solution and a copper blank with an oxide layer, e. g. as in Example 1, is also immersed in the bath. The coppering of the oxide surface on the blank sets in without time lag at least a few points and the reaction spreads over the whole surface within two to five minutes. One may now withdraw the plate or let it remain for another few minutes for the metallic copper coating to gain in thickness. The reaction now proceeds perpendicularly to the surface, slowly attacking the underlying cuprous oxide.

*Example 3.*—The procedure described in Examples 1 or 2 is followed, except that Fehling's solution is added to the alkaline aldehyde bath, e. g. one volume of Fehling's solution is added to 5 volumes of the alkaline aldehyde solution, although these can be mixed in any desired proportion. In this case, not only is the outer portion of the oxide turned into metallic copper, but also the copper complex of the Fehling's solution contributes to the layer formed which thereby can be made thicker than without the addition of Fehling's solution. Instead of the latter, other alkaline solutions in which copper is complexed, e. g. citrate containing solutions, can be used.

*Example 4.*—A copper blank, the outside of which consists of cuprous oxide (obtainable, for instance, by stripping the usual outermost layer of black cupric oxide by immersing the blank for a short time in cyanide solution), is dipped during one minute in a 0.2% aqueous solution of silver nitrate. The blank is then withdrawn, rinsed with water, and immersed in the alkaline aldehyde bath of Example 1 or 3. The silver ions adsorbed during the silver nitrate dip are automatically turned into metallic nuclei, owing to the aldehyde present, and these nuclei then initiate the reduction of copper oxide. The coppering therefore starts without time lag and may be discontinued at any desired moment.

*Example 5.*—Oxidized copper plates are immersed in one litre of a 20% aqueous solution of potassium carbonate and 40 ml. of commercial formaldehyde (about 40% by weight) are added. The subsequent treatment is as set forth in Examples 2 or 3.

*Example 6.*—5 ml. of acetaldehyde, 1.5 grams of caustic soda, and 100 ml. of water are made into a solution. Oxidized copper plates carrying an outer layer of cupric oxide are immersed into this solution and left in it until their surface has turned into copper. Induction may be speeded up by providing for the presence of copper oxide powder, as in Example 2, or by a dip in dilute silver nitrate solution prior to the alkaline aldehyde treatment, as shown in Example 4. The copper film may be strengthened by addition of Fehling's solution to the acetaldehyde bath.

*Example 7.*—Oxidized copper plates are immersed in one litre of a 10% aqueous solution of caustic potash. 20 ml. of 40% formaldehyde solution are stirred into the bath. One plate already coppered in a previous similar operation is also immersed and loose contact of its coppered face with the uncoppered oxide surface of the new plates is fostered by a slight rocking movement of the bath. The old plate thus induces the reaction on the surface of the new plates. Fehling's solution may be added to the bath to help strengthening the copper film.

*Example 8.*—2 grams of potassium hydroxide, 100 ml. of water, and 5 ml. commerical formaldehyde solution are mixed together. Oxidized copper blanks, with an outside layer of cupric oxide, are immersed and their surface is touched with the tip of a platinum wire. The tip may previously be cleaned by melting a bead of caustic potash on it. The platinum, after a few seconds of contact with the immersed oxide, causes the autocatalytic reaction to start at the point of contact. The reaction then spreads laterally, without further help of the platinum, within a few minutes. As in Example 3, any proportion of Fehling's solution may be present in the bath.

*Example 9.*—A plate of porous copper, produced for instance by sintering cooper powder in an inert atmosphere, is heated in air to oxidize the pore surface. The plate is then immersed in an aqueous solution about half molar in both formaldehyde and caustic soda. The pore surface is thereby spontaneously reconverted to copper which, since formed by autocatalysis, is catalytically active and may be used, for instance, to catalyse dehydrogenations.

*Example 10.*—Pumice covered with a layer of cupric oxide—prepared, for instance, by impregnating with copper nitrate and heating—is brought into the solution described in Examples 1 or 3. When the formation of hydrogen has nearly ceased, the pumice is removed and washed with alcohol. It may now be used as a catalyser.

What I claim is:

1. A process of treating a copper oxide coating carried upon a solid base, which comprises reducing the surface portion of said copper oxide coating to metallic copper by immersing said base carrying said coating in a liquid aqueous solution of formaldehyde containing a free alkali until the surface portion of said copper oxide coating has been reduced to metallic copper, such aqueous solution being at not substantially above atmospheric temperature.

2. In the reduction of the surface portion of an article which comprises a solid base carrying a coating of copper oxide, the improvement which consists in first immersing said article in a dilute solution of a silver compound, and following this by the process as set forth in claim 1.

3. A process of treating a copper oxide coating carried upon a solid base which comprises reducing the surface portion of said copper oxide coating to metallic copper by immersing said base carrying said coating in an aqueous solution of formaldehyde containing a free alkali until the surface portion of said copper oxide coating has been reduced to metallic copper, such aqueous solution also containing a dissolved copper compound.

4. A process of treating a copper oxide coating carried upon a solid metallic copper base which comprises reducing the surface portion of said copper oxide coating to metallic copper by immersing said base carrying said coating in an aqueous solution of formaldehyde containing a free alkali until the surface portion of said copper oxide coating has been reduced to metallic copper.

5. A process of treating a copper oxide coating carried upon a solid base which comprises reducing the surface portion of said copper oxide coating to metallic copper by immersing said base carrying said coating in an aqueous solution of formaldehyde containing a dissolved caustic alkali until the surface portion of said copper oxide coating has been reduced to metallic copper.

6. A process of treating a copper oxide coating carried upon a solid base which comprises reducing the surface portion of said copper oxide coating to metallic copper by immersing said base carrying said coating in an aqueous solution of formaldehyde containing a free alkali and adding finely pulverulent particles of metallic copper to said aqueous solution and continuing contact of said coated article with the aqueous solution until the surface portion of said copper oxide coating has been reduced to metallic copper.

7. A process of treating a copper oxide coating carried upon a metallic copper base which comprises reducing the surface portion of said copper oxide coating to metallic copper by immersing said base carrying said coating in an aqueous solution of formaldehyde containing a free alkali until the surface portion of said copper oxide coating has been reduced to metallic copper, and withdrawing the article from said reducing liquid before all of the copper oxide coating has been reduced to the metallic state.

8. A process of treating a copper oxide coating carried upon a solid base which comprises reducing the surface portion of said copper oxide coating to metallic copper by immersing said base carrying said coating in an aqueous solution of formaldehyde containing a dissolved alkali metal carbonate until the surface portion of said copper oxide coating has been reduced to metallic copper.

9. A process of treating a copper oxide coating carried upon a solid base which comprises reducing the surface portion of said copper oxide coating to metallic copper by immersing said base carrying said coating in a liquid solution of an aldehyde containing free alkali, said aldehyde not containing unsaturated carbon-carbon bonds, until the surface portion of said copper oxide coating has been reduced to metallic copper.

10. In the process as set forth in claim 9, the step of adding an alkaline solution containing a dissolved copper compound to the said reducing liquid, whereby the film of metallic copper is strengthened.

PAUL HERSCH.

References Cited in the file of this patent

UNITED STATES PATENTS

| Number | Name | Date |
|---|---|---|
| 1,746,867 | Piersol | Feb. 11, 1930 |
| 1,905,724 | Liebel et al. | Apr. 25, 1933 |

OTHER REFERENCES

W. Weiland, Annalen der Chemie, 431, 1923, page 301.

Walker, "Formaldehyde," 1944, Reinholt Pub. Co., pages 119 and 136.